Nov. 10, 1953 D. M. CLEVELAND Re. 23,732

WORK HOLDER

Original Filed March 26, 1948

INVENTOR.
Donald M. Cleveland

BY

McMorrow, Berman & Davidson
Attorneys

Reissued Nov. 10, 1953

Re. 23,732

UNITED STATES PATENT OFFICE 23,732

WORK HOLDER

Donald M. Cleveland, Geneva, N. Y., assignor, by mesne assignments, to Sundstrand Machine Tool Co., Rockford, Ill., a corporation of Illinois Original No. 2,593,538, dated April 22, 1952, Serial No. 17,300, March 26, 1948. Application for reissue August 12, 1953, Serial No. 373,929

6 Claims. (Cl. 90—59)

Matter enclosed in heavy brackets [ ] appears in the original patent but forms no part of this reissue specification; matter printed in italics indicates the additions made by reissue.

This invention relates to improvements in work holders.

An object of the invention is the provision of a simple and efficient work holder or support which will be positioned automatically in engagement with the work by the release of a clamping means, said means being employed for fixing the support in the adjusted position.

A further object of the invention is the provision of an efficient work holder or support in which a work-engaging member, is moved automatically into position with the work when a spring acting on the work-engaging member is released by a few turns on a nut, said nut being employed for fixing the work-engaging member in its automatically adjusted position, said member being shifted by a piston reciprocated in a barrel with cooperating means on the piston and barrel for preventing the piston from being discharged from the barrel.

The invention consists in the novel construction, arrangement and combinations of parts hereinafter more particularly described and claimed.

Figure 1:
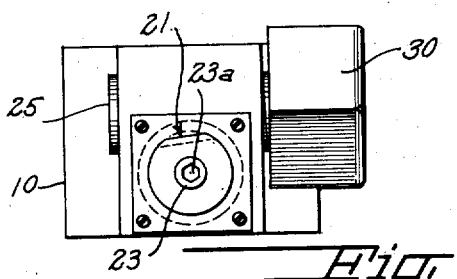
Figure 1 is a plan view of one form of my support.

Referring more particularly to Figures 1 to 4 inclusive, 10 designates a base member adapted to be attached to or mounted on a surface or a fixture of a milling or a vertical boring machine or other machines in which it is necessary to employ a support under the work to prevent the work from springing away from the tools. A post *or housing* 11 formed integrally with the base has a vertical passage 12 extending through the post. The lower end of said passage is threaded to receive a plug 13. Said post is rectangular in cross section. The top of the post and in embracing relation with the passage 12 is provided with a countersunk recess 14 for the reception of a steel washer 15 and a felt washer 16. A plate or cap 17 is secured to the top of the post and has a central passage in alignment with the passage 12. These washers have a flat side to fit the flat side 21 of the piston or bar.

A piston or bar 20 is mounted for vertical sliding movement in post 11. A flat portion 21 extends for a portion of the length of the piston. Said flat portion has a taper of .005 of an inch for each inch of length. This taper counteracts any tendency for the piston to slip when a pull is exerted thereon. A stop flange 22 at the lower end of the piston prevents the piston from being discharged from the passage 12. A stud 23 is threaded into a pocket in the upper end of the piston and is used for applying work engaging members to said piston. The outer end of the stud is provided with a socket 23a adapted to be engaged by a suitable tool for turning the stud. A coil spring 24 is located in the passage 12 between the lower end of the piston 20 and the plug 13 and tends to force the piston upwardly at all times in the post.

A wedge 25 in the shape of a round rod is mounted in a passage 26 located transversely of the post 11. Said passage opens into the vertical passage 12 so that a flat portion 27 of the wedge will be in engagement with the flat portion 21 of the piston 20.

Figure 2:
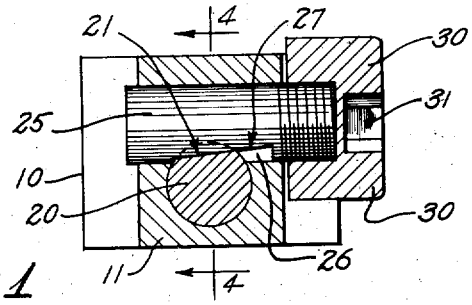
Figure 2 is a horizontal section of the support taken along the line 2—2 of Figure 3.
Figure 3:
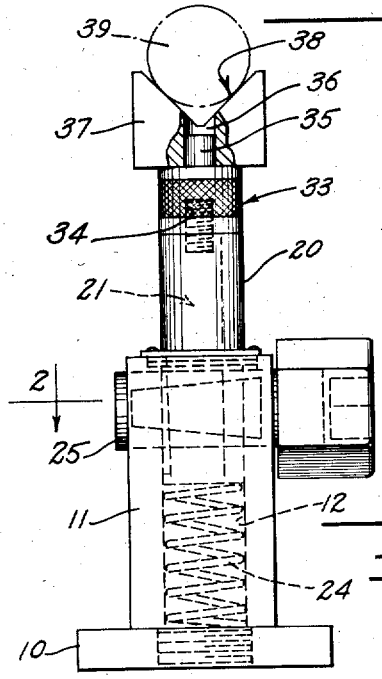
Figure 3 is a side view in elevation of the support shown in operative relation with a piece of work.

It will be noted from Figure 2 that an edge of the flat portion 27 of the wedge 25 will be contacted by the flange 22 on the lower end of the piston 20 and will prevent the spring 24 from ejecting the piston from the passage 12. A hexagonal nut 30 is threaded into the outer projecting end of the wedge 25 for drawing said wedge up tight on the piston 20. The nut may be rotated by the usual wrench or by an Allen wrench which is applied to a socket 31.

A knurled connector 33 has a threaded socket 34 to receive the projecting end of the stud 23. A pin 35 extends upwardly from the connector and is received by a passage 36 in a saddle 37 provided with a V-shaped notch 38. The notch is particularly adapted to receive a piece of work 39 which is circular in cross section.

Figure 5:
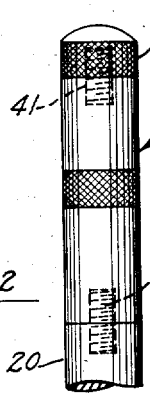
Figure 5 is a fragmentary view in elevation of an extension which is applied to the support.
Figure 4:
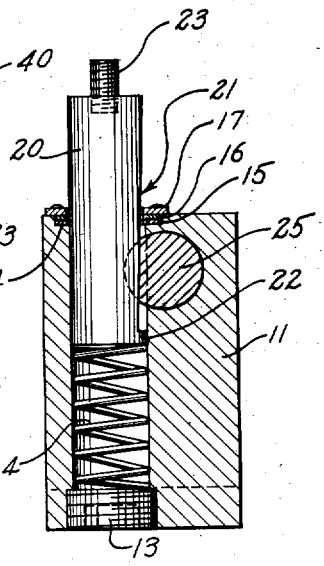
Figure 4 is a vertical section taken along the line 4—4 of Figure 2.

In Figure 5 is shown an extension 40 which may be applied to the stud 23 and which is employed to support work at a higher elevation. A second threaded stud 41 projects vertically from the upper end of the extension. A knurled cap 42 is mounted on said stud.

Figure 6:
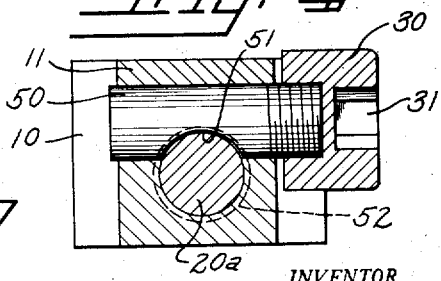
Figure 6 is a fragmentary view in elevation and partly in section showing a modified form of a work engaging member.

In Figure 6, another form of work-engaging member is disclosed for used with flat work. The threaded stud 23 of the piston 20 receives a connector 43 which has a universal socket 44 receiving a ball 45. A shank 46 rises from the ball and carries a plate 47 for supporting the work.

Figure 7:
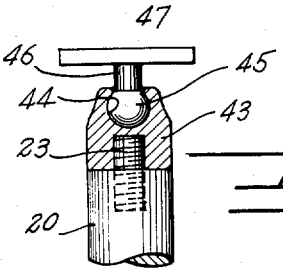
Figure 7 is a horizontal section of another form of the support.

In Figure 7 is shown a modified form or wedge or clamping element and the associated piston. All the other elements, however, are identical in construction with similarly placed elements illustrated in Figures 1 to 4 inclusive and therefore the same reference numerals will be applied. In this form, the clamping element or rod 50 is circular in cross section and has an arcuately shaped notch 51, receiving the piston 20a. The lower end of said piston is provided with a circular flange 52 which will be engaged by the member 50 to prevent accidental ejection of the piston by the spring 24. The nut 30 drawns the member 50 up tight on the piston for fixing the piston in position against the tension of the spring.

The operation of the support and its application to a piece of work is simple. After the base 10 has been applied suitably to a machine and after the piston 20 or 20a has been depressed and secured in place by the member 25 or 50, the proper work-engaging member is applied to the upper end of the piston. With the work in place, the nut 30 is released to permit the spring 24 to raise the piston and position the work-engaging member in contact with the work. The nut 30 is then drawn up taut for retaining the piston in its elevated position.

After the operations on the work have been completed, the nut 30 is released. Downward pressure on the work-engaging member will lower the piston after which the nut 30 is drawn up taut for holding the piston in an inoperative position.

The washer 15 in co-operation with the felt washer 16 prevents filing or other fine metal particles from reaching the interior of the hollow post 11. The plate 17 maintains the washers in place when the piston 20 is reciprocated in the passage 12 in the post.

No washers are employed in Figure 7 in connection with the piston 20a. Said piston may be machined to provide a close fit in the passage 12 so that metal particles cannot enter the passage.

What I claim is:

1. A work support comprising a post having a longitudinal bore extending through one end of the post, a substantially vertical reciprocatory bar mounted within the bore of the post and having one end exposed beyond said end of the post, work engaging means carried by said one end of the bar, a spring mounted within the bore of the post and engaging the other end of said bar and urging said bar out of said one end of the post, the upright post being provided with a tranverse bore intersecting the bore of the post, a transverse locking rod slidably mounted within the transverse bore of the post and extending laterally beyond opposite sides of the bar, the locking rod being provided in its side with a recess receiving the bar and defining a clamping surface, one end of the locking rod extending laterally outwardly beyond one side of the post and being screw-threaded, and a nut mounted upon the screw-threaded end of the locking rod and turnable for drawing the locking rod axially in a direction to clamp the bar between the clamping surface of the recess and the bore of the [port] *post*.

2. In combination, a post having a longitudinal bore extending through one end thereof, a reciprocatory bar slidably mounted in the bore and having one end exposed beyond said one end of the post, a spring mounted in said bore and engaging the other end of the bar and urging said bar outwardly of said one end of the post, said bar being formed in its side with a longitudinally extending flat face arranged at an angle to the longitudinal axis of the bar and diverging toward said one end of the bar, the post being formed with a transverse [bar] *bore* intersecting the longitudinal bore of the post, a locking rod slidably mounted in the transverse bore and extending crosswise of the reciprocatory bar, said locking rod being formed with a longitudinally extending flat face engaging the flat face of the bar, the flat face of the locking rod being arranged at an angle to the longitudinal axis of the locking rod, said rod having a threaded end extending beyond the side of the post, and a nut threaded on said threaded end of the locking rod, said nut being rotatable on said threaded end to bear against a portion on the post and move said plunger rod endwise in the transverse bore so as to wedge said bar between the longitudinal bore of the post and the flat face of the locking rod and thereby lock the bar in a selected longitudinal position.

*3. In combination, a post having a longitudinal bore extending through one end thereof, a reciprocatory bar slidably mounted in the bore and having one end exposed beyond said one end of the post, a spring mounted in said bore and engaging the other end of the bar and urging said bar outwardly of said one end of the post, said bar being formed in its side with a longitudinally extending flat face arranged at an angle to the longitudinal axis of the bar and diverging toward said one end of the bar, the post being formed with a transverse bore intersecting the longitudinal bore of the post, a locking rod slidably mounted in the transverse bore and extending crosswise of the reciprocatory bar, said locking rod being formed with a longitudinally extending flat face engaging the flat face of the bar, the flat face of the locking rod being arranged at an angle to the longitudinal axis of the locking rod, and means for moving said locking rod endwise in the transverse bore to wedge said bar between the longitudinal bore of the post and the flat face of the locking rod and thereby lock the bar in a selected extended position.*

*4. A work support comprising: an upright post having a longitudinal bore extending through one end of said post and a transverse bore intersecting said longitudinal bore; an elongated bar mounted within said longitudinal bore and having one end extending beyond said end of the post, said one end being provided with a work engaging member; a spring mounted within the longitudinal bore and engaging the other end of said bar normally to urge the bar outwardly of the post; a rod slidably mounted within the transverse bore and extending laterally beyond the sides of the elongated bar; a pair of flat coacting wedging surfaces, the first wedging surface being formed longitudinally of said bar and at an angle to the axis of said bar diverging toward said one end of the bar, and the second surface being formed longitudinally of said rod and at an angle to the axis of said rod so that endwise movement of said rod toward said bar brings said second surface into engagement with said first surface to wedge said bar between the second surface and the longitudinal bore of the post; and means for*

*providing endwise movement of said rod to wedge said bar in a selected extended position.*

*5. A work support comprising: a housing having a longitudinal bore intersected by a transverse bore; an elongated bar mounted for reciprocable movement in said longitudinal bore and having an end provided with a work engaging member; first means urging said bar outwardly of the house; a rod slidably mounted in said transverse bore and intersecting said elongated bar; a pair of co-acting wedging surfaces, the first of said wedging surfaces being formed in a side of the bar at an angle diverging from the axis of said bar, and the second of said wedging surfaces being formed in a side of said rod at an angle diverging from the axis of said rod so that the surfaces may be brought into wedging engagement by endwise movement of said rod; and means for moving said rod endwise in the transverse bore to wedge said bar between the longitudinal bore of the housing and the second wedging surface.*

*6. A work support comprising: an upright post having a longitudinal bore extending through one end of said post and a transverse bore intersecting said longitudinal bore; an elongated bar*

*mounted within said longitudinal bore and having an end extending beyond said end of the post, said end being provided with a work engaging member; a spring mounted within the longitudinal bore and engaging the other end of said bar normally to urge the bar outwardly of the post; a locking rod slidably mounted in said transverse bore of the post, said rod having a curved recess in its side defining a clamping surface adapted to engage the lateral surface of said bar; and means for moving said rod endwise in the transverse bore to draw said clamping surface tightly against said lateral surface to clamp said bar between the clamping surface and the post.*

DONALD M. CLEVELAND.

References Cited in the file of this patent or the original patent

UNITED STATES PATENTS

| Number | Name | Date |
|---|---|---|
| 1,782,660 | Meyer | Nov. 25, 1930 |
| 1,890,423 | Teagarden | Dec. 6, 1932 |
| 2,243,905 | Hubschneider | June 3, 1941 |
| 2,424,090 | Gardinier | July 15, 1947 |